United States Patent
Schultz et al.

(10) Patent No.: US 6,746,977 B2
(45) Date of Patent: Jun. 8, 2004

(54) WAX-IMPREGNATED TOWELETTE

(75) Inventors: Michael A. Schultz, Lockport, IL (US); Karen P. Glover, Palos Park, IL (US)

(73) Assignee: Turtle Wax, Inc., Chicago, IL (US)

( * ) Notice: Subject to any disclaimer, the term of this patent is extended or adjusted under 35 U.S.C. 154(b) by 39 days.

(21) Appl. No.: 10/043,414

(22) Filed: Jan. 10, 2002

(65) Prior Publication Data

US 2003/0129420 A1 Jul. 10, 2003

(51) Int. Cl.[7] .......................... B32B 27/02; B32B 25/20
(52) U.S. Cl. .......................... 442/164; 442/60; 442/81; 442/84; 442/87; 442/90; 442/171; 442/400; 428/447
(58) Field of Search .......................... 442/164, 60, 81, 442/84, 87, 90, 171, 400; 428/447; 106/3, 10, 11, 271, 287.1, 287.11, 287.16; 516/53, 55, 76, 77; 222/80, 92, 30, 84

(56) References Cited

U.S. PATENT DOCUMENTS

| | | | |
|---|---|---|---|
| 4,013,475 A | * | 3/1977 | Liebowitz et al. ............ 106/10 |
| 4,427,111 A | * | 1/1984 | Laipply ...................... 206/210 |
| 4,535,912 A | * | 8/1985 | Bonk .......................... 221/46 |
| 4,683,001 A | | 7/1987 | Floyd et al. |
| 4,940,626 A | * | 7/1990 | Rhodes et al. .............. 428/198 |
| 4,963,432 A | * | 10/1990 | Fuggini et al. ............. 442/165 |
| 5,330,787 A | | 7/1994 | Berlin et al. |
| 6,475,934 B1 | * | 11/2002 | Nonaka et al. ............... 442/60 |
| 2002/0094738 A1 | * | 7/2002 | Ishii et al. ..................... 442/81 |
| 2002/0098763 A1 | * | 7/2002 | Yoshikawa et al. ......... 442/340 |

* cited by examiner

*Primary Examiner*—Jeffrey B. Robertson
(74) *Attorney, Agent, or Firm*—Olson & Hierl, Ltd.

(57) ABSTRACT

A moist wax-impregnated towelette suitable for polishing a lightly-soiled exterior surface of a vehicle without buffing and without abrading the vehicle surface comprises a low-lint fabric such as melt-blown polypropylene non-woven fabric, impregnated with an aqueous silicone-based car wax emulsion in an amount of about 30 to about 170 grams of emulsion per square meter of fabric. The aqueous silicone-based car wax emulsion contains a isopropanol, a silicone oil, an amino-functional silicone, a cationic emulsifier, a nonionic emulsifier, an anti static agent, a silicone polyether wetting agent and optionally contains a wax such as carnauba wax. The wetting agent provides for even distribution of the aqueous car wax emulsion into the fabric and further promotes the even distribution of the car wax onto the vehicle surface when wiped thereon.

33 Claims, No Drawings

WAX-IMPREGNATED TOWELETTE

FIELD OF THE INVENTION

This invention relates to a disposable fabric sheet impregnated with car wax. More particularly, this invention relates to a low-lint fabric sheet impregnated with a silicone-based aqueous car wax emulsion and a silicone polyether wetting agent.

BACKGROUND OF THE INVENTION

A number of products are available for polishing and waxing cars. Typically these materials are paste or liquid wax formulations. The waxes are applied by wiping a cloth over the wax surface and rubbing the wax onto the vehicle or by pouring a liquid wax onto the cloth or vehicle and rubbing the wax over the surface of the vehicle. Such products generally require that the wax be allowed to dry for a period of time. Then the surface of the vehicle must be buffed to remove excess wax and polish the surface. Unlike wax-based products, car waxing formulations based on silicone oil do not require buffing.

U.S. Pat. No. 4,683,001 to Floyd et al. discloses a one step dry-and-shine polishing cloth for polishing a pre-washed, wet automobile surface. The cloth simultaneously polishes the car and dries the surface. The Floyd et al. polishing cloth is a dry product which comprises a non-woven polyolefin fabric sheet, such as a melt-blown polypropylene fabric sheet that is discontinuously coated with a formulation of saponified and non-saponified waxes and silicone oils. The wax formulations disclosed by Floyd et al. are generally high solids water-in-oil emulsions that are printed onto the fabric in a pattern that covers generally about 9 to 25 percent of the surface of the fabric, utilizing gravure printing methods and the like. The wax components of the polishing compositions of Floyd et al. comprise about 5 to 50% of the formulation on a weight basis. Although the polishing cloths of Floyd et al. eliminate the need for buffing, they do require that the automobile surface be wet prior to application of the wax.

Polishing a dry, lightly soiled automobile surface is generally problematic, since the soil particles abrade the finish of the car causing undesirable scratch marks, thus it is generally a requirement that car waxes be applied to a clean surface. It would be desirable to provide a car polishing product that can be applied to a dry, lightly soiled surface without scratching the finish of the vehicle, and that does not require buffing.

SUMMARY OF THE INVENTION

A moist, wax-impregnated towelette, suitable for polishing a lightly dirty automobile exterior surface without abrading the vehicle finish, is a low-lint fabric sheet substantially uniformly impregnated with an aqueous silicone-based wax emulsion containing a silicone polyether wetting agent, which is a dialkylsiloxane-alkylene oxide copolymer. The wax-impregnated towelette of the present invention preferably comprises a sheet of low-lint fabric, such as melt-blown polypropylene non-woven fabric, impregnated with about 30 grams to 170 grams of an aqueous silicone based wax emulsion per square meter of fabric.

The aqueous silicone-based car wax emulsions of the present invention contain a silicone oil, such as polydimethylsiloxane, an amino-functional silicone, such as an aminoethylaminopropylsiloxane-dimethylsiloxane copolymer, isopropanol, nonionic and cationic emulsifiers, anti static agent, and a silicone polyether wetting agent, such as an ethylene oxide-dimethylsiloxane copolymer and a wax, such as carnauba wax. The car wax emulsions may optionally contain small amounts of UV absorbers, solvents such as mineral oil and butyl cellosolve, fragrances, preservatives, additional wetting agents, antifoaming agents, and neutralizing agents such as mineral acids or organic acids, and the like.

The silicone-based wetting agent component of the aqueous silicone-based car wax emulsions provides for a substantially uniform distribution of the wax emulsion into the fabric sheet. In addition, the wetting agent aids in the application of the car wax to the exterior surface of a vehicle when the impregnated sheet is wiped across the vehicle surface. The amino-functional silicone components for the formulations provide strength and durability to the wax film after application to the vehicle surface. The fabric sheet material is chosen so as to minimize streaking and to minimize lint deposits on the finish of the vehicle during the polishing process. A high-gloss protective film, substantially free of lint, is thus obtained, without the need for buffing or additional wiping away of excess polish as is generally required with car wax application. Because of the high lubricity of the silicone-based wax formulation, the wax-impregnated towelettes of the present invention may be utilized to polish a dry, lightly soiled vehicle surface without washing and without abrading or scratching the vehicle finish.

DETAILED DESCRIPTION OF PREFERRED EMBODIMENTS

A moist, wax-impregnated towelette, suitable for polishing a lightly dirty automobile exterior surface without washing and without abrading the vehicle finish comprises a low-lint fabric sheet impregnated with an aqueous silicone-based wax emulsion and a silicone polyether wetting agent.

As used herein, the term "silicone" and grammatical variations thereof means a polymer having the general formula $(R_nSiO_{((4-n)/2)})_m$ wherein n is between 0 and 3 and m is 2 or greater, as defined in *Silicone Compounds Register and Review*, 5th Edition, R. Anderson, G. L. Larson and C. Smith Eds., Hüls America Inc., Piscataway, N.J., p 247 (1991). Silicones may be linear or branched. The term "amino functional silicone" and grammatical variations thereof means a silicone as defined above, wherein the alkyl or aryl group is substituted with a primary, secondary or tertiary amino group. The term "silicone-based" as used herein means a material that contains a silicone component.

The term "car wax" and grammatical variations thereof, as used herein, means a composition suitable for polishing the exterior surface of a vehicle such as a car, truck, motorcycle, or the like. As used herein, the term "wax-impregnated towelette" means a disposable sheet of pliant material impregnated or coated with a car wax formulation, of a size suitable for hand application of car wax to a vehicle surface. The term "low-lint" means a fabric that does not leave a visible deposit of fibers on a vehicle surface when utilized for application of car wax.

When referred to herein, the viscosity of a liquid component of the invention is quoted as a kinematic viscosity in centistokes (cSt), measured at 25° C. (77° F.) unless otherwise specified.

Fabric sheet materials useful for the wax-impregnated towelettes of the present include any low-lint fabric. Preferably, the low-lint fabric is a melt-blown polypropylene fabric such as described in U.S. Pat. No. 4,683,001 to Floyd et al., the relevant disclosures of which are incorporated herein by reference. The fabric sheets generally have a weight of about 20 grams per square meter (0.75 ounce per square yard) to about 200 grams per square meter (6 ounces per square yard), preferably about 33 grams per square meter (1 ounce per square yard). Also suitable are substantially low-lint fabrics such as polyurethane-coated polyester fabrics.

Preferably, the silicone-based car wax useful with the wax-impregnated towelettes of the present invention is an aqueous emulsion containing about 1 to about 5 weight percent isopropanol, about 0.5 to about 1 weight percent of a silicone oil, about 0.01 to about 1 weight percent of an amino functional silicone, about 0.001 to about 0.15 weight percent of a wax, about 0.05 to about 0.15 weight percent of a cationic emulsifier, about 0.01 to about 0.08 weight percent of a nonionic emulsifier, about 0.01 to about 0.1 weight percent of an antistatic agent, and about 0.05 to about 0.5 weight percent of a silicone polyether wetting agent.

Preferred silicone oils are $C_1-C_{18}$ alkyl or $C_6-C_{10}$ aryl substituted polysiloxanes, more preferably poly($C_1-C_4$ dialkyl)siloxanes. Most preferably, the silicone oil is a polydimethylsiloxane. The silicone oils useful in the car wax emulsions of the present invention preferably comprise a silicone oil, or a mixture of silicone oils, having a viscosity in the range of about 10 centistokes (cSt.) to about 60,000 cSt, more preferably about 10 cSt to about 5000 cSt, most preferably about 10 cSt to about 1000 cSt. Silicone oils are commercially available from a variety of manufacturers such as GE Silicones of Waterford, N.Y. and Dow Corning Corporation of Midland, Mich.

Amino-functional silicones useful in the present invention include silicone polymers which contain primary, secondary or tertiary amino functional groups. Preferably the amino-functional silicones are copolymers of dialkylsiloxane and amino-functional siloxane comonomers. Preferably the amino-functional silicones contain about 1 to about 50 mole percent of amino-functional siloxane comonomer units, more preferably about 1 to about 30 mole percent of amino-functional siloxane comonomer units. These silicone fluids may contain starting materials and reaction by-products in addition to the amino-functional dialkylpolysiloxane. Suitable amino-functional silicones include those disclosed in co-owned U.S. Pat. No. 4,665,116 to Kornhaber et al., the pertinent disclosures of which are incorporated herein by reference.

A useful amino-functional dialkylpolysiloxane, for example, can be derived from the equilibration of a polydialkylsiloxane having a viscosity of about 1 to about 30,000 cSt and an amino-functional silane or siloxane in the presence of a basic catalyst. Typical polydialkylsiloxanes useful for the preparation of amino-functional silicones include cyclic dimethysiloxane oligomers having about 3 to about 10 dimethylsiloxane monomer units.

The amino-functional silanes or siloxanes, which are reacted with the dialkylpolysiloxanes may be represented by the general formula (I):

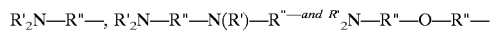    (I)

wherein G represents the radicals R, OR"; NR'$_2$, or OSiR$_3$ in which R is $C_1-C_{18}$ alkyl or $C_6-C_{10}$ aryl, R' represents hydrogen or monovalent hydrocarbon radicals having 1 to about 18 carbon atoms, R" is a substituted or unsubstituted divalent $C_1-C_{18}$ hydrocarbon radical, a substituted or unsubstituted divalent alkyleneoxy group in which the oxygen provides an ether linkage, or an unsaturated divalent $C_4-C_{18}$ hydrocarbon radical; Q is a radical selected from the group consisting of:

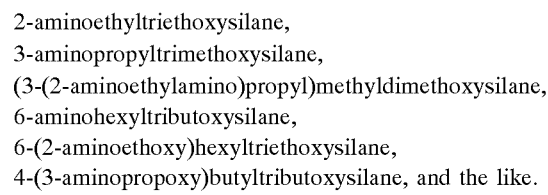

Z is a radical selected from the group consisting of $R_3SiO_{0.5}$, and $R'_2NR"O_{0.5}$ in which R, R' and R" are the same as above, a is a number having a value of about 0 to about 2; b is a number having a value of about 0 to about 3; and x is a number having a value of about 1 to 20,000. Preferably, R' is hydrogen.

Illustrative divalent radicals represented by R" are hydrocarbon radicals having from 2 to 18 carbon atoms such as ethylene, trimethylene, tetramethylene, hexamethylene, octamethylene; alkyleneoxy group radicals having the formulas: $(-OC_2H_4-)_r$, $(-OC_2H_4OCH_2-)_r$ and $(-OC_3H_6-)_r$ in which r is a number having a value of about 1 to about 50, such as ethylene oxide, trimethylene oxide and polymers thereof and alkylene radicals such as vinylene, propenylene, butenylene, hexenylene and the like.

Examples of suitable amino-functional silanes include but are not limited to:

2-aminoethyltriethoxysilane, 3-aminopropyltrimethoxysilane, (3-(2-aminoethylamino)propyl)methyldimethoxysilane, 6-aminohexyltributoxysilane, 6-(2-aminoethoxy)hexyltriethoxysilane, 4-(3-aminopropoxy)butyltributoxysilane, and the like.

Useful amino-functional dialkylpolysiloxanes and methods for preparing them are described in U.S. Pat. Nos. 3,890,269, 3,960,575 and 4,247,330 the pertinent disclosures of which are incorporated herein by reference.

Preferred amino-functional silicones are polymers comprising repeating units represented by the general formula (II):

$$[-Si(R_{(2-p)})(Q_p)O-]q[-Si(CH_3)_2O-]y \qquad (II)$$

wherein Q is a radical selected from the group consisting of:

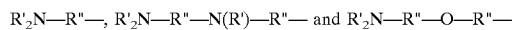

R is $C_1-C_{18}$ alkyl or $C_6-C_{10}$ aryl; R' represents hydrogen or monovalent hydrocarbon radicals having 1 to about 18 carbon atoms; R" is a substituted or unsubstituted divalent $C_1-C_{18}$ hydrocarbon radical, a substituted or unsubstituted divalent alkyleneoxy group in which the oxygen provides an ether linkage, or an unsaturated divalent $C_4-C_{18}$ hydrocarbon radical; p is number having a value in the range of about 1 to about 2; q is a number having value in the range of about 1 to about 2000; and y is a number having value in the range of about 0 to about 2000; with the proviso that the sum of q and y is at least about 15.

Examples of suitable amino-functional silicones include
(2-aminoethyl)methylpolysiloxane,
(3-aminopropyl)methylpolysiloxane,
(2-aminoethyl-3-aminopropyl)methylpolysiloxane,
(3-(2-aminoethyoxy)propyl)methylpolysiloxane,
(6-aminohexyl)methylpolysiloxane,
(3-(2-aminoethoxy)propyl)methylpolysiloxane,
(3-(2-aminoethylamino)propyl)methylsiloxane,
dimethylsiloxane copolymers thereof, and the like.

Useful amino-functional dialkylpolysiloxanes and methods for preparing them are described in U.S. Pat. Nos. 3,890,269, 3,960,575 and 4,247,330 whose pertinent disclosures are incorporated herein by reference.

A preferred amino-functional polydimethylsiloxane is commercially available under the designation SF-1706 from GE Silicones, Waterford, N.Y., and is a mixture of aminoethyaminopropylpolysiloxane, having Chemical Abstract Service (CAS) Registry No. 67923-07-3 and methoxy-terminated dimethylsiloxane polymers having CAS Registry No. 68440-84-6, according to the manufacturer's Material Safety Data Sheet (MSDS) for the product. Other suitable amino-functional silicones are available from GE Silicones, of Waterford, N.Y. and OSi Specialties, Inc. of Danbury, Conn.

Waxes suitable for use in the wax-impregnated towelettes of the present invention include vegetable waxes such as carnauba, candelilla, and ouricury; mineral waxes such as montan, paraffin, and microcrystalline waxes; animal waxes, such as, beeswax; silicone waxes; and mixtures thereof. A vegetable wax such as carnauba wax is particularly preferred.

Cationic and nonionic emulsifiers useful in the aqueous silicone-based car wax emulsions of the present invention include cationic surfactants such as described in the review on surfactants by Cahn and Lynn, "Surfactants and Detersive Systems" *Kirk-Othmer Encyclopedia of Chemical Technology,* 3rd Edition, Volume 22, John Wiley & Sons, New York, pp. 332–432 (1983), the relevant disclosures of which are incorporated herein by reference. An extensive listing of cationic and nonionic surfactants and commercial sources thereof can be found in *McCutcheon's, Volume 1: Emulsifiers & Detergents,* 2001 North American Edition, McCutcheon's Division, The Manufacturing Confectioner Publishing Co., Rock Glen, N.J. (2001), the relevant disclosures of which are incorporated herein by reference.

Preferred cationic emulsifiers include an amine, an aliphatic or rosin amine ethoxylate, an amidoamine, and a quaternary ammonium salt. Amphoteric detergents that display cationic properties below about pH 7 can also be used.

Typical amine cationic emulsifiers include amines derived from fatty acids and rosins such as hydrogenated tallow amine, stearyl amine, lauryl amine, and the like, which are typically commercially available as acetate, oleate or naphthalenate salts. Other useful amine cationic emulsifiers include N-alkyltrimethyleneamines having the general formula R*NHCH$_2$CH$_2$CH$_2$NH$_2$, wherein R* is an alkyl group derived from natural oils such as coconut, tallow and soybean oils and the like; 2-alkylimidazolines, such as 2-heptadecylimidazoline, 2-heptadecenylimidazoline and the like; and 1-aminoethyl 2-alkyl imidazolines.

Typical commercially available aliphatic and rosin amine ethoxylate cationic emulsifiers include $C_6$ to $C_{20}$ alkyl amines and rosin amines that have been ethoxylated with about 2 to about 50 moles of ethylene oxide per mole of amine, such as cocoamine, soyamine or stearylamine ethoxylated with 2 to 15 moles of ethylene oxide per mole of amine.

Typical amidoamine cationic emulsifiers include condensation products of fatty carboxylic acids with di- and polyamines, such as condensates of diethylenetriamine with stearic, oleic, coconut, or tall oil fatty acids, and the like.

Typical quaternary amine cationic emulsifiers include dialkyldimethylammonium salts, such as dicocodimethylammonium chloride, distearyldimethylammonium chloride, and the like; alkylbenzyldimethylammonium chlorides such as cocobenzyldimethylammonium chloride, tallowbenzyldimethylammonium chloride, stearylbenzyldimethylammonium chloride and the like; and alkyltrimethylammonium salts such as cetyltrimethylammonium chloride, myristyltrimethylammonium bromide and the like; wherein the alkyl groups are derived from fatty amines and rosin amines.

Particularly preferred cationic emulsifiers include fatty amines and rosin amines such as hydrogenated tallow amine, and rosin amine ethoxylates, such as N,N-bis(2-hydroxyethyl)cocamine.

Preferred nonionic surfactants useful in the compositions and methods of the present invention include an alcohol alkoxylate, a polyol ester of a fatty acid, a polyoxyethylene ester of a fatty acid, a fatty acid amide, a polyoxyethylene fatty acid amide, a polyalkylene oxide block copolymer, an ethoxylated alkyl mercaptan, an ethoxylated anhydrosorbitol ester, an alkyl polyglycoside, and mixtures thereof.

Typical alcohol alkoxylates include ethoxylated $C_6$ to $C_{18}$ linear and branched alcohols, ethoxylated with about 2 to about 80 moles of ethylene oxide, such as ethoxylated lauryl alcohol, ethoxylated stearyl alcohol, and ethoxylated mixtures of $C_6$–$C_{18}$ alcohols, and alkoxylated natural alcohols such as ethoxylated-propoxylated pine oil, ethoxylated soya sterol, and the like.

Typical polyol esters of fatty acids include saturated fatty acid monoglycerides, such as glycerol monolaurate, glycerol monococo ester, glycerol monotallow ester, glycerol monostearate, and the like; saturated fatty acid diglycerides, such as glycerol distearate, glycerol dilaurate and the like; unsaturated fatty acid monoglycerides, such as glycerol monooleate, glycerol monoricinoleate, and the like; unsaturated fatty acid diglycerides, such as glycerol dioleate, glycerol dilinoleate, and the like; glycol esters of fatty acids, such as propylene glycol monostearate, ethylene glycol monostearate, ethylene glycol monolaurate, diethylene glycol monooleate, diethylene glycol monostearate, and the like; and anhydrosorbitol fatty acid esters, such as mono, di and tri esters of 1,4-sorbitan with fatty acids such as stearic acid, palmitic acid and oleic acid.

Typical polyoxyethylene esters of fatty acids are polyethylene glycol mono- and di-esters of fatty acids comprising a polyethylene glycol portion having from about 5 to about 30 ethyleneoxy units, esterified at one or both ends with fatty acids such as stearic acid, lauric acid, oleic acid, and mixed fatty acids derived from natural oils such as coconut oil, castor oil, tall oil, and the like.

Typical fatty acid amides include diethanolamine fatty acid condensates such as coco diethanolamide, lauric diethanolamide, tall oil diethanolamide, and the like, and monoalkanolamine fatty acid condensates such as coco monoethanolamide, lauric monoethanolamide, stearic monoisopropanolamide, oleic monopropanolamide, and the like.

Typical polyoxyethylene fatty acid amides are ethoxylated mono and dialkanolamides having from about 2 to about 50 ethylene oxide groups, including ethoxylated lauric monoisopropanolamide, ethoxylated stearic diethanolamide, ethoxylated myristic monoethanolamide, ethoxylated oleic diethanolamide, and the like.

Typical polyalkylene oxide block copolymers include copolymers of ethylene oxide and propylene oxide initiated by ethylene glycol, propylene glycol, trimethylol propane, and the like, and have either linear or branched structures, depending on whether the initiator has two or three hydroxyl groups, respectively.

Typical ethoxylated alkyl mercaptans, include linear of branched alkyl mercapatans such as dodecylmercaptan, ethoxylated with 2 to 10 moles of ethylene oxide.

Typical ethoxylated anhydrosorbitol esters are mono, di and tri esters of 1,4-sorbitan with fatty acids such as stearic acid, palmitic acid and oleic acid that have been ethoxylated with about 4 to about 20 moles of ethylene oxide per mole of anhydrosorbitol ester.

Typical alkyl polyglycosides are glycosides (acetals) of $C_6$–$C_{20}$ alcohols with a monosaccharide such as glucose, fructose, lactose, mannose, xylose and the like or a polysaccharide or oligosaccharide such as isomaltose, maltose, cellobiose, mellobiose, maltotriose and the like.

Particularly preferred nonionic emulsifiers include sorbitan esters such as sorbitan monolaurate (e.g., Span® 20, available from Uniqema, Wilmington, Del.), ethoxylated anhydrosorbitol esters such as monooleylanhydrosorbitan ethoxylated with 20 moles of ethylene oxide per mole of sorbitan (e.g., Tween® 80, available from Uniqema, Wilmington, Del.) and linear alcohol ethoxylates up to 9 moles of ethylene oxide per mole of alcohol (e.g., Neodol® 1–9, available from Shell Chemical Co., Houston, Tex.), and the like.

Suitable antistatic agents useful in the aqueous silicone-based car wax emulsions of the present invention include quaternary fatty acid amine condensates, polyamine resins, fatty amines, amides, fatty acid esters and other materials as decribed in the article "Antistatic Agents" by Zeeve Gur-Arieh and Bertie J. Reuben in *Kirk-Othmer Concise Encyclopedia of Chemical Technology*, John Wiley & Sons, New York, pp. 130–131 (1985), the disclosures of which are incorporated herein by reference. A particularly preferred antistatic agent is Larostat® 264A, available from BASF Corp., Mount Olive, N.J., which is a modified soyadimethylethylammonium ethosulfate. Other suitable antistatic agents are water-soluble quaternary compounds.

Preferred silicone polyether wetting agents for use in aqueous silicone-based car wax emulsions are block copolymers having at least one polyalkylene oxide block, such as polyethylene oxide, polypropylene oxide, mixtures thereof, and the like, and at least one poly($C_1$–$C_4$ dialkyl)siloxane, such as polydimethylsiloxane. Most preferred are copolymers of ethylene oxide and dimethylsiloxane.

Particularly preferred silicone polyethers are copolymers of ethylene oxide and dimethylsiloxane that are commercially available from GE Silicones of Waterford, N.Y., OSi Specialties, Inc. of Danbury, Conn. and Dow Corning Corporation of Midland, Mich. The polymers may have a linear block structure with alternating polyalkylene oxide and polydimethylsiloxane blocks or the polyalkylene oxide blocks may be grafted onto a polydimethylsiloxane backbone.

Optional components of aqueous silicone-based car wax emulsions useful in the wax-impregnated towelettes of the present invention include UV absorbers such as benzotriazoles, benzophenones, and the like; polymeric UV absorbers having a UV chromophore attached to a polymer backbone, solvents such as mineral oil and butyl cellosolve, fragrances, preservatives, additional wetting agents, antifoaming agents, neutralizing agents such as mineral acids or organic acids as well as polishing agents such as aluminum oxide, calcined clay, alkali and alkaline earth carbonates, and the like. The optional components may comprise up to about 15 weight percent of the aqueous silicone-based car wax emulsion, usually about 1 weight percent.

Preferably, the aqueous silicone-based car wax emulsion of the present invention contains silicone oil and amino-functional silicone in a weight ratio of about 1:1 to about 10:1, more preferably about 6:1. The preferred weight ratio of silicone oil to silicone polyether wetting agent is about 2:1 to about 5:1, more preferably about 3:1.

Preferably the cationic emulsifier is present in the car wax emulsion in a ratio of silicone oil to cationic emulsifier of about 5:1 to about 10:1, more preferably about 8:1. The nonionic emulsifier is preferably present in the car wax emulsion in a ratio of silicone oil to nonionic emulsifier of about 10:1 to about 30:1, more preferably about 20:1.

Preferably, the aqueous silicone-based car wax emulsions useful in the wax-impregnated towelettes of the present invention contains about 90 to about 97 weight percent water.

The wax-impregnated towelettes of the present invention are preferably impregnated with the aqueous silicone-based car wax emulsion in an amount in the range of about 30 grams (about 1 oz.) per square meter to about 170 grams (about 6 oz.) per square meter, more preferably about 30 to about 140 grams of emulsion per square meter of fabric.

Preferably, the moist wax-impregnated towelettes are packaged in containers or pouches that are substantially moisture-tight to prevent the wipes from drying out. Individual wax-impregnated towelettes may be packaged, in disposable, sealed, single-use pouches. Alternatively, a plurality of wipes may be packaged in a multi-use, moisture-tight, resealable, dispensing container. Typically, a moist wax-impregnated towelette has a size and shape that is convenient for hand-polishing of a vehicle surface, for example a rectangular sheet of about 7 inches by 16 inches, or square or circular sheet of similar area.

Alternatively, the moist wax-impregnated towelettes may be packaged in a continuous roll form in a resealable, dispensing container having a cutting device or tearing aid affixed to the container, such that a consumer could choose the size of the wipe convenient for a given polishing job by tearing off a desired portion of the roll. The continuous roll of wipes may also be provided with perforations across the width of the roll at regular intervals along the length of the roll, such that one or more wipes may be torn from the roll without the need for a cutting aid.

The moist wax-impregnated towelettes may have a substantially flat, even surface or may have a dimpled, ridged, or otherwise textured surface. Preferred is a bonded or embossed melt blower polypropylene web.

The moist wax-impregnated towelettes of the present invention may be manufactured by combining a pre-cut, rolled length of the material with an aliquot of car wax emulsion, for example about 30 grams per square meter to about 170 grams per square meter. A roll coating technique, known in the art, can be utilized as well. The silicone polyether wetting agent in the aqueous silicone-based car wax emulsion facilitates penetration and even distribution of the emulsion into the fabric.

EXAMPLE 1

Wax-Impregnated Towelette Formulation A

Sheets of melt-blown polypropylene non-woven fabric (7 inches wide by about 16 inches long) having a weight of about 30 grams per square meter were substantially uniformly impregnated with about 140 grams of aqueous silicone-based car wax emulsion per square meter of fabric. The aqueous car wax emulsion contained about 95 weight percent water, about 3 weight percent isopropanol, about 0.8 weight percent silicone oil, about 0.13 weight percent amino-functional silicone, about 0.1 weight percent of cationic emulsifier, about 0.04 weight percent nonionic surfactant, about 0.28 weight percent silicone polyether wetting agent, about 0.06 weight percent antistatic agent, about 0.2 weight percent preservative, about 0.26 weight percent solvent, and about 0.003 weight percent wax.

The following components were utilized in Example 1 hereinabove:

The silicone oil was a 3:1:1 blend of silicone oils having viscosities of about 20, 350 and 1000 cSt respectively, which corresponds to an aggregate viscosity of about 80 cSt.

The amino-functional silicone was an aminoethylaminopropyl polydimethylsiloxane having a viscosity of about 10 to about 50 cSt and an amine content of about 0.48 milliequivalents of base per gram of polymer, available under the designation SF-1706 from GE Silicones of Waterford, N.Y.

The silicone polyether was a 1:10 by weight mixture of Silwet® L-7602 available from OSi Specialties, Inc. of Danbury, Conn. and SF1488 available from GE Silicones of Waterford, N.Y. According to the manufacturer's product bulletin and MSDS, SF1488 is an ethoxylated polydimethylsiloxane, wherein the ethoxylated portion of the polymer is terminated by 3-hydroxypropyl group, with a typical viscosity of 10 to 50 cSt at 25° C., having CAS Registry No. 102783-01-7. Silwet® polymers are described by the manufacturer's product bulletin as block copolymers which are polyalkylene oxide-modified polydimethylsiloxanes.

The cationic emulsifier was a mixture of a quaternary amine a bis(2-hydroxyethyl) soyamine and a hydrogenated tallow amine acetate in a weight ratio of about 100:33:1 respectively.

The solvent was a 11:1 mixture by weight of mineral oil to butyl cellosolve; the wax was carnauba wax; the preservative was Busan® 77, available from Buckman Laboratories, Memphis, Tenn.; and the antistatic agent was Larostat 264A, available from BASF Corp., Mount Olive, N.J.

The wax-impregnated towelette of Example 1 was utilized for polishing a dry, lightly soiled automobile exterior surface. An even, high-gloss finish was obtained without any visible scratching of the finish. Exterior surfaces that can be polished in this manner include painted surfaces, plastic surfaces, metal trim and similar non-porous automobile body parts.

Numerous variations and modifications of the embodiments described above may be effected without departing from the spirit and scope of the novel features of the invention. It is to be understood that no limitations with respect to the specific embodiments illustrated herein are intended or should be inferred. It is, of course, intended to cover by the appended claims all such modifications as fall within the scope of the claims.

We claim:

1. A moist wax-impregnated towelette comprising a substantially low-lint fabric sheet substantially uniformly impregnated with an aqueous silicone-based car wax emulsion comprising a silicone oil, an amino functional silicone, a wax, isopropanol, a nonionic emulsifier, a cationic emulsifier, an antistatic agent and a silicone polyether wetting agent.

2. The wax-impregnated towelette of claim 1 wherein the fabric sheet comprises melt-blown polypropylene.

3. A moist wax-impregnated towelette comprising a substantially low-lint fabric sheet substantially uniformly impregnated with an aqueous silicone-based car wax emulsion comprising a silicone oil, an amino functional silicone, a wax, isopropanol, a nonionic emulsifier, a cationic emulsifier, an antistatic agent and a silicone polyether wetting agent, wherein the fabric sheet is impregnated with an amount of aqueous silicone-based car wax emulsion in the range of about 30 to about 170 grams of emulsion per square meter of fabric.

4. The wax-impregnated towelette of claim 3 wherein the fabric sheet is impregnated with an amount of aqueous silicone-based car wax emulsion in an amount of about 140 grams of emulsion per square meter of fabric.

5. The wax-impregnated towelette of claim 3 wherein the aqueous silicone-based car wax emulsion comprises about 90 to about 97 weight percent water.

6. A wax-impregnated towelette comprising a substantially low-lint fabric sheet impregnated with an aqueous silicone-based car wax emulsion comprising:
   a) about 1 to about 5 weight percent isopropanol;
   b) about 0.5 to about 1 weight percent silicone oil;
   c) about 0.01 to about 1 weight percent amino-functional silicone;
   d) about 0.001 to about 0.15 weight percent wax;
   e) about 0.05 to about 0.15 weight percent cationic emulsifier;
   f) about 0.01 to about 0.08 weight percent of a nonionic emulsifier;
   g) about 0.01 to about 0.1 weight percent antistatic agent; and
   h) about 0.05 to about 0.5 weight percent silicone polyether wetting agent.

7. The wax-impregnated towelette of claim 6 wherein the fabric sheet comprises melt-blown polypropylene.

8. A wax-impregnated towelette comprising a substantially low-lint fabric sheet impregnated with an aqueous silicone-based car wax emulsion comprising:
   a) about 1 to about 5 weight percent isopropanol;
   b) about 0.5 to about 1 weight percent silicone oil;
   c) about 0.01 to about 1 weight percent amino-functional silicone;
   d) about 0.001 to about 0.15 weight percent wax;
   e) about 0.05 to about 0.15 weight percent cationic emulsifier;
   f) about 0.01 to about 0.08 weight percent of a nonionic emulsifier;
   g) about 0.01 to about 0.1 weight percent antistatic agent; and
   h) about 0.05 to about 0.5 weight percent silicone polyether wetting agent,
   wherein the fabric sheet is impregnated with an amount of aqueous silicone-based car wax emulsion in the range of about 30 to about 170 grams of emulsion per square meter of fabric.

9. The wax-impregnated towelette of claim 8 wherein the low-lint fabric sheet is impregnated with an amount of aqueous silicone-based car wax emulsion in an amount of about 140 grams of emulsion per square meter of fabric.

10. The wax-impregnated towelette of claim 8 wherein the silicone oil is a polydimethylsiloxane having a viscosity in the range of about 10 to about 60,000 centistokes.

11. The wax-impregnated towelette of claim 10 wherein the silicone oil is a polydimethylsiloxane having a viscosity in the range of about 10 to about 5000 centistokes.

12. The wax-impregnated towelette of claim 8 wherein the silicone oil is a polydimethylsiloxane having a viscosity in the range of about 10 to about 1000 centistokes.

13. The wax-impregnated towelette of claim 8 wherein the amino-functional silicone is a polymer comprising repeating units represented by the general formula:

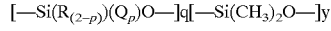

wherein Q is a radical selected from the group consisting of:

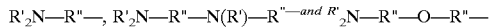

R is $C_1$–$C_{18}$ Gig alkyl or $C_6$–$C_{10}$ aryl; R' represents hydrogen or monovalent hydrocarbon radicals having 1 to about 18 carbon atoms; R" is a substituted or unsubstituted divalent $C_1$–$C_{18}$ hydrocarbon radical, a substituted or unsubstituted divalent alkyleneoxy group in which the oxygen provides an ether linkage, or an unsaturated divalent $C_4$–$C_{18}$ hydrocarbon radical; p is number having a value in the range of about 1 to about 2; q is a number having value in the range of about 1 to about 2000; and y is a number having value in the range of about 0 to about 2000; with the proviso that the sum of q and y is at least about 15.

14. The wax-impregnated towelette of claim 8 wherein the wax is selected from the group consisting of a vegetable wax, a mineral wax, an animal wax, a silicone wax, and a mixture thereof.

15. The wax-impregnated towelette of claim 8 wherein the cationic surfactant is selected from the group consisting of an amine, an aliphatic or rosin amine ethoxylate, an amidoamine, a quaternary ammonium salt, and a mixture thereof.

16. The wax-impregnated towelette of claim 8 wherein the silicone polyether wetting agent is a block copolymer of polyalkylene oxide and polydimethylsiloxane.

17. The wax-impregnated towelette of claim 16 wherein the polyalkylene oxide is polyethylene oxide.

18. The wax-impregnated towelette of claim 8 wherein the silicone oil and the amino-functional silicone are present in the aqueous silicone-based car wax emulsion in a weight ratio in the range of about 1:1 to about 10:1.

19. The wax-impregnated towelette of claim 18 wherein the weight ratio of silicone oil to amino-functional silicone is about 6:1.

20. The wax-impregnated towelette of claim 8 wherein the silicone oil and the silicone polyether wetting agent are present in the aqueous silicone-based car wax emulsion in a weight ratio in the range of about 2:1 to about 5:1.

21. The wax-impregnated towelette of claim 20 wherein the weight ratio of silicone oil to silicone polyether wetting agent is about 3:1.

22. The wax-impregnated towelette of claim 8 wherein the silicone oil and the cationic emulsifier are present in the aqueous silicone-based car wax emulsion in a weight ratio in the range of about 5:1 to about 10:1.

23. The wax-impregnated towelette of claim 22 wherein the weight ratio of silicone oil to cationic emulsifier is about 8:1.

24. The wax-impregnated towelette of claim 8 wherein the silicone oil and the nonionic emulsifier are present in the aqueous silicone-based car wax emulsion in a weight ratio in the range of about 10:1 to about 30:1.

25. The wax-impregnated towelette of claim 24 wherein the weight ratio of silicone oil to nonionic emulsifier is about 20:1.

26. The wax-impregnated towelette of claim 8 wherein the aqueous silicone-based car wax emulsion has a water content of about 90 to about 97 weight percent.

27. The wax-impregnated towelette of claim 8 wherein the aqueous silicone-based car wax emulsion further comprises up to about 15 weight percent of additional components selected from the group consisting of neutralizing agents, UV absorbers, solvents, preservatives, fragrances, anti-foaming agents and polishing agents.

28. An article of manufacture comprising a moist wax-impregnated towelette in packaged form, wherein the wax-impregnated towelette comprises a low-lint fabric sheet impregnated with an aqueous silicone-based car wax emulsion comprising a silicone oil, an amino-functional silicone, a wax, isopropanol, a nonionic emulsifier, a cationic emulsifier, an antistatic agent and a silicone polyether wetting agent, and wherein the fabric sheet is impregnated with an amount of said aqueous silicone-based car wax emulsion in the range of about 30 to about 170 grams of emulsion per square meter of fabric.

29. The article of manufacture of claim 28 wherein an individual moist wax-impregnated towelette is packaged in a single-use, substantially hermetically-sealed, disposable pouch.

30. The article of manufacture of claim 28 wherein a plurality of moist wax-impregnated towelettes are packaged in a re-sealable, moisture-tight, dispensing container.

31. The article of manufacture of claim 28 comprising a continuous roll of low-lint fabric impregnated with an aqueous silicone-based car wax emulsion comprising a silicone oil, an amino-functional silicone, a wax, isopropanol, a nonionic emulsifier, a cationic emulsifier, an antistatic agent and a silicone polyether wetting agent, packaged in a re-sealable dispensing container.

32. The article of manufacture of claim 31 wherein the dispensing container comprises a cutting aid adapted for cutting potions of the roll into individual sheets.

33. The article of manufacture of claim 31 wherein the continuous roll is perforated across the width of the role at regular intervals along the length of the roll.

* * * * *